Sept. 22, 1953  E. C. KIEKHAEFER  2,652,728
CRANKSHAFT, PISTON, AND CONNECTING ROD
FOR INTERNAL-COMBUSTION ENGINES
Filed Dec. 19, 1949
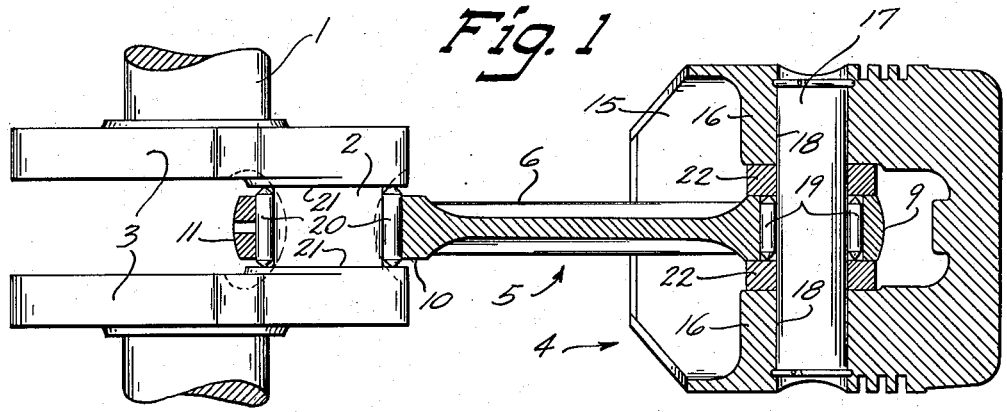
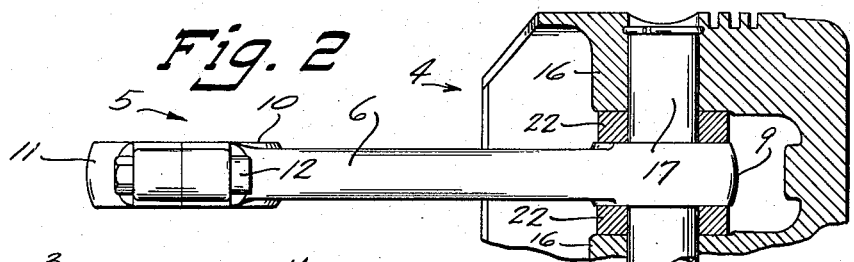
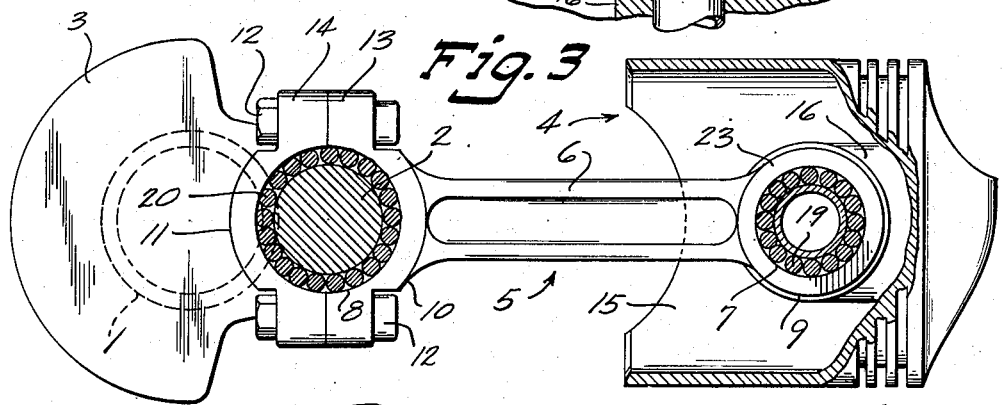
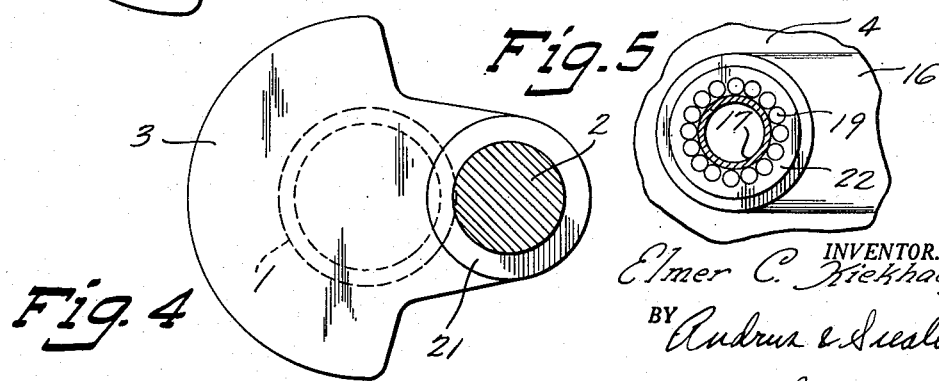
INVENTOR.
Elmer C. Kiekhaefer
BY Andrus & Sceales
Attorneys Patented Sept. 22, 1953

2,652,728

UNITED STATES PATENT OFFICE 2,652,728

CRANKSHAFT, PISTON, AND CONNECTING ROD FOR INTERNAL-COMBUSTION ENGINES

Elmer C. Kiekhaefer, Cedarburg, Wis.

Application December 19, 1949, Serial No. 133,833

5 Claims. (Cl. 74—44)

1

This invention relates to connecting rods for reciprocating pistons of internal-combustion engines and the like and particularly to the upper and lower bearings.

The invention provides for free axial movement of the lower, crank-end of the connecting rod with the lateral movement of the rod secured on the wrist pin between the wrist pin bosses of the piston.

An object of the invention is to prevent binding of the connecting rod at either end thereof and reduce the frictional losses to lower factors.

A more particular object is to eliminate or reduce the frictional engagement of the parts at the lower end of the rod moving relatively of each other at high speeds, and to secure the rod at its upper end whereby the rod is supported laterally by the piston which moves relatively of the connecting rod at lower speeds and in various types of engines receives more adequate lubrication.

Another object is to eliminate the necessity of hardening the entire crank pin length of the crankshaft particularly as where the crank pin comprises the inner bearing race for a set of rolls.

A more particular object is to maintain the lower, crank-end of the rod on the crank pin with equal and substantial clearances between the opposite faces of the crank cheeks.

A further object is to utilize induction heat treating methods for hardening the crank pin.

Another object is to permit the use of induction heating to assure hardening of the opposite faces of the crank cheeks of the crankshaft.

Another object is to provide for a considerable lateral adjustment or accommodation of the piston with respect to the crankshaft without unbalancing the longitudinal forces carried by the rod.

These and other objects and advantages will be more fully set forth in the following description of a preferred embodiment of the invention as illustrated in the accompanying drawing.

In the drawing:

Figure 1 shows one crank of an engine crankshaft, and a piston and connecting rod in section taken in a plane containing the axes of the upper and lower bearings of the rod;

Fig. 2 is a view showing the piston as in Fig. 1 and the rod in elevation and as supported laterally by the piston;

Fig. 3 is an elevational view taken normal to the bearing axes and with parts of the crankshaft and piston broken away and sectioned;

Fig. 4 is an elevation of one crank cheek showing the bearing face formed by the cheek and taken through the crank pin which joins the two crank cheeks of the crankshaft; and Fig. 5 is a sectional view taken through the wrist pin showing a thrust bearing in elevation and supporting the rollers for the upper bearing.

The forged steel crankshaft 1 shown in the drawings as for an internal-combustion engine, not shown, includes the crank pin 2 which is formed of circular section between the spaced pair of cranks or cheeks 3.

The piston 4 shown in the drawings is adapted to reciprocate in a corresponding combustion cylinder of the engine and is connected to crank pin 2 of the crankshaft by the connecting rod 5 to transmit the rectilinear thrust of the forces of combustion on the piston to the crankshaft.

Connecting rod 5 comprises essentially the narrow beam 6 provided with the accurately finished parallel bores 7 and 8 in the upper and lower, larger ends 9 and 10, respectively. The lower end 10 of rod 5 includes the separable cap 11 which forms the lower half of bore 8. The bolts 12 passing through holes in the corresponding bosses 13 and 14 on opposite sides of bore 8 join cap 11 and rod 5, and are provided for assembly of the lower end 10 of the rod on crank pin 2.

Piston 4 includes the hollow skirt 15 which supports the piston in the cylinder walls of the engine. The bosses 16 formed oppositely on the inside of skirt 15 are provided to support the wrist pin 17 in the aligned holes 18 which are bored through the piston to intersect at right angles the axis of the piston. In the assembled rod and piston, pin 17 extends through bore 7 of the upper end 9 of rod 5 with the latter disposed between bosses 16 inside skirt 15.

The upper and lower bearing axes are necessarily parallel to allow the piston and rod to move without binding at either end of the rod. In normal practice, the lower bearing is secured against movement relative to the crankshaft and axially of the bearing referred to while the upper end of the rod is free to move on the wrist pin or the wrist pin, if secured to the rod, is allowed movement in the bosses of the piston. Where ball or roller bearings are not employed a bearing fit may be provided directly between the upper bores 7 and wrist pin 17 and lower bore 8 and the crank pin 2.

The needle rollers 19 and 20 of suitable lengths, are preferably employed, as shown, in high speed engines and roll between bore 7 and pin 17 which form the outer and inner races of the upper bearing, respectively, and between the lower bore 8 and crank pin 2 similarly comprising the lower bearing.

The stepped circular faces 21 formed by cranks 3 at opposite ends of crank pin 2 are spaced to maintain rolls 20 in alignment on crank pin 2 within bore 8. The thrust collars 22 carried by wrist pin 17 and disposed between bosses 16 and the ends of the upper end 9 of rod 5 serve to maintain rolls 19 in alignment on wrist pin 17.

According to the invention, the upper end 9 of rod 5 is secured axially between collars 22 on the upper bearing or rolls 19 and the lower end 10 of the rod is unsupported between cranks 3 or within the lengthwise dimensions of rolls 20 of the lower crankshaft bearing.

The opposite end faces 23 of the upper end 9 of rod 5 are accurately finished and engage corresponding collars 22 with a running fit. Collars 22 are adapted to support rod 5 in a plane defined by the axes of the wrist pin and crankpin and independently of the bearing rolls 19 or other bearing means between rod 5 and pin 17. The large size of upper end 9 of rod 5 to accommodate rolls 19 is utilized to full advantage by providing large bearing areas supporting the rod laterally therebetween as described. The large diameters of collars 22 and end faces 23 involve no appreciable frictional losses because of the particular relative movement between rod 5 and piston 4. The movement referred to is oscillatory and of small extent and considerably less than that between the crankshaft and the connecting rod.

The invention provides for the automatic adjustment of the rod on the crankshaft to accommodate the relative positioning of the crankshaft and piston. The crankshaft is of such construction and weight that the slight changes in force involved does not effect any detectable unbalance of the shaft. Furthermore, the lower bearing which operates at the higher speeds is relieved of the lateral thrust or weight of the rod. The additional weight of the parts of the reciprocating upper bearing required to carry the thrust or weight of the rod is nominal.

By providing for the axial bearing support of rod 5 on wrist pin 17 at the upper end of the rod, the lower end 10 may be dimensioned to provide considerable clearances between the rod and the ends of the crank pin 2 so that the thrust of the rod is carried by the center section of the crank pin.

The preparation of the bearing surfaces of the crankshaft ordinarily requires hardening processes which are rendered difficult by the complicated form of the crankshaft.

Furthermore, the proper hardening of the faces of the crank cheeks to provide the necessary end bearing support of the rod and rolls where employed, is also a difficult process. Hardening of the crank pin by induction heating is of considerable advantage in production and provides a pattern which includes portions of the crank cheeks adjacent the crank pins. Since the latter portions form the retaining walls for the rolls where employed the hardening pattern as shown in Fig. 1 is particularly advantageous.

However, the zone of hardening obtained by ordinary induction heating methods is of greatest depth in the center region and of considerably less depth towards the ends of the crank pin.

According further to the invention the lower end 10 of rod 5 is mounted on rolls 20 and is supported through the latter by the hardened center region only of crank pin 2.

The invention provides a rod and assembly which is particularly fitted to the hardening pattern of induction heating methods which provides crank pins of greatest bearing qualities at the center section.

Expensive hardening methods which must be resorted to in order otherwise to obtain the required uniform hardening pattern are eliminated.

The connecting rod is particularly adapted for small, high speed internal-combustion engines where a considerable length of service without breakdown and a high weight per horse-power ratio is required. The improved bearing surfaces afforded by the invention at both the upper and lower ends of the rod permit the use of a flat rod having equally small transverse dimensions at each end facilitating manufacture of the rod.

Various embodiments of the invention may be employed within the scope of the following claims.

I claim:

1. The combination with a crankshaft having a crank pin and a piston having a wrist pin, of a connecting rod and separable end cap defining a lower bearing at one end of said rod mounted on said crank pin and axially movable relative thereto within the corresponding dimensions of said crank pin, an upper bearing formed in the opposite end of said rod receiving said wrist pin, and axial thrust bearings carried by said wrist pin between said piston and the upper end of said rod preventing other than rotational movement of said rod with respect thereto whereby the relative axial movement between the connecting rod and crank pin is limited by said bearings, said axial thrust bearings being dimensioned to provide axial support of said rod on a substantial radius of the upper bearing of the rod whereby the rod is confined and axially supported at the upper end thereof independently of the wrist pin.

2. The combination in an engine, of a piston, a crankshaft having a crank pin with end bearing faces, a series of rollers disposed in bearing engagement with said crank pin and retained in alignment between said end faces, a wrist pin carried by said piston, a second series of rollers disposed in bearing engagement with said wrist pin, bearing members axially supported by said piston and disposed to retain said last named rollers in alignment, and a connecting rod having a finished cylindrical bore at its lower end in bearing engagement with said first named rollers and free to move axially on said first named rollers, said rod having a finished cylindrical bore at its upper end in bearing engagement with said second named rollers and opposite finished end faces in bearing engagement with said bearing members, whereby said bearing members prevent other than the rotational movement of said rod on said pins.

3. The combination in an engine, of a crankshaft, a crank pin formed by said crankshaft and having end bearing faces, a series of rollers disposed in bearing engagement with said crank pin and retained in alignment between said end faces, a piston, a wrist pin carried by said piston, a second series of rollers disposed in bearing engagement with said wrist pin, bearing members carried by said wrist pin and axially supported by said piston to retain said last named rollers in alignment, and a connecting rod having a finished cylindrical bore at its lower end in bearing engagement with said first named rollers and of a size permitting axial movement of said rod on said first named rollers, said rod having a finished cylindrical bore and opposite finished end faces at its upper end respectively in bearing engagement with said second named rollers and with said bearing members.

4. In combination with a piston having a wrist pin and a crankshaft having a crank pin, a connecting rod having upper and lower parallel bores forming bearings at opposite ends thereof rotatably mounted respectively on said wrist pin and crank pin, and axial thrust bearings carried by said piston on each side of the upper end of said rod and confining the rod therebetween, said thrust bearings having a diameter substantially greater than the length of the upper bore of the rod, said rod being provided with normal clearances whereby said bearings are disposed to support the rod against lateral deflection independently of the rotatable mounting of the rod on said crank pin and wrist pin.

5. The invention as recited in claim 4 wherein the axial thrust bearings provide an axial support of the rod on a substantial radius respecting the upper bearing whereby normal bearing tolerances maintained between the rod and thrust bearings do not allow deflection of the rod such as would cause binding between the rod and either of said pins.

ELMER C. KIEKHAEFER.

References Cited in the file of this patent
UNITED STATES PATENTS

| Number | Name | Date |
|---|---|---|
| Re. 18,080 | Gotz | May 26, 1931 |
| 1,375,142 | Forkner | Apr. 19, 1921 |
| 1,408,475 | Schapp | Mar. 7, 1922 |
| 1,542,209 | Bergeron | June 16, 1925 |
| 1,696,468 | Buhr | Dec. 25, 1928 |
| 1,717,066 | Rockwell | June 11, 1929 |
| 1,838,901 | Blackmore | Dec. 29, 1931 |
| 2,043,014 | Shoemaker | June 2, 1936 |
| 2,053,534 | Robinson | Sept. 8, 1936 |
| 2,065,509 | Bell | Dec. 29, 1936 |
| 2,259,324 | Robinson | Oct. 14, 1941 |

FOREIGN PATENTS

| Number | Country | Date |
|---|---|---|
| 157,961 | Great Britain | Jan. 10, 1921 |